United States Patent [19]

Clemens

[11] 4,306,544
[45] Dec. 22, 1981

[54] SOLAR WATER HEATER

[76] Inventor: Mark H. Clemens, Rte. 1 Box 258H, Monroe, Oreg. 97456

[21] Appl. No.: 132,324

[22] Filed: Mar. 20, 1980

[51] Int. Cl.$^3$ .............................................. F24J 3/02
[52] U.S. Cl. .................................. 126/437; 126/434; 126/438; 126/450
[58] Field of Search ............... 126/433, 434, 438, 436, 126/439

[56] References Cited

U.S. PATENT DOCUMENTS

| | | | |
|---|---|---|---|
| 629,122 | 7/1899 | Davis | 126/438 |
| 705,350 | 7/1902 | Hubert | 126/434 |
| 2,122,821 | 7/1938 | Mohr | 126/434 |
| 4,083,359 | 4/1978 | Smith | 126/433 |
| 4,084,578 | 4/1978 | Ishibashi | 126/437 |
| 4,127,104 | 11/1978 | Greene | 126/450 |

FOREIGN PATENT DOCUMENTS

| | | | |
|---|---|---|---|
| 38-21676 | 3/1963 | Japan | 126/434 |

OTHER PUBLICATIONS

Anderson, B. N., "Solar Energy: Fundamentals in Building Design", McGraw-Hill, 1977, pp. 125–140.

*Primary Examiner*—James C. Yeung
*Attorney, Agent, or Firm*—James D. Givnan, Jr.

[57] ABSTRACT

A solar powered water heater including a housing within which are a water storage tank, reflective coated insulation and a solar panel. Pressurized water such as from a municipal water system is fed into the tank interior via a tank supply conduit. A reverse flow of preheated water from the tank to the solar panel occurs during passive heat siphoning. A solar panel supply conduit in communication with the first mentioned conduit has a lower flow capacity to assure water from the source being directed into the water tank for preheating prior to heat siphoning flow through the solar panel. A modified housing includes an adjustable window with a reflective layer for increased solar reflection toward the water tank.

4 Claims, 4 Drawing Figures

U.S. Patent   Dec. 22, 1981   4,306,544
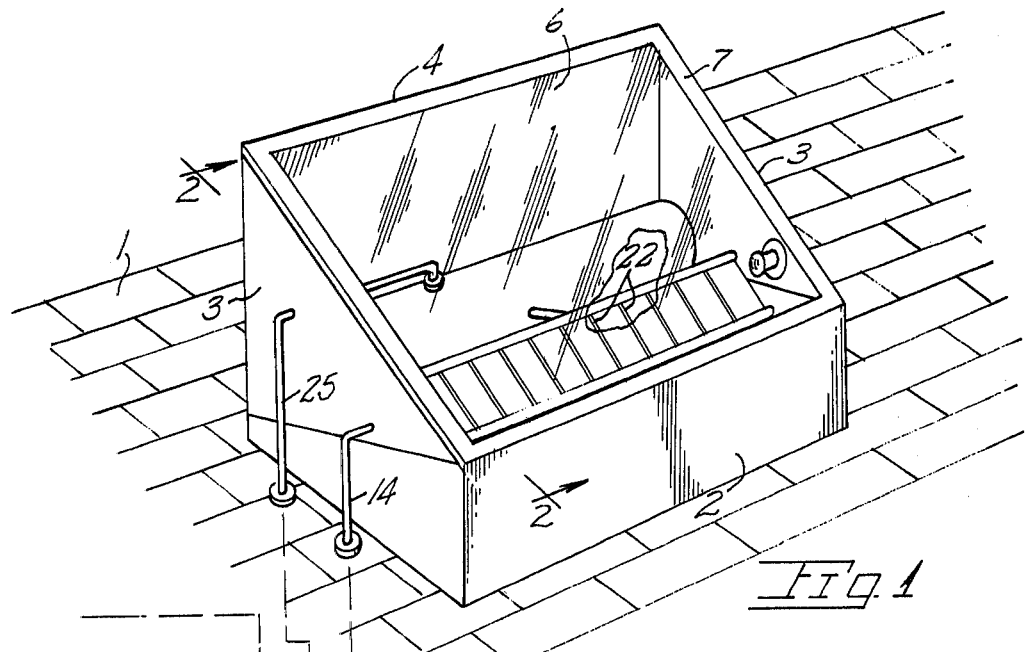
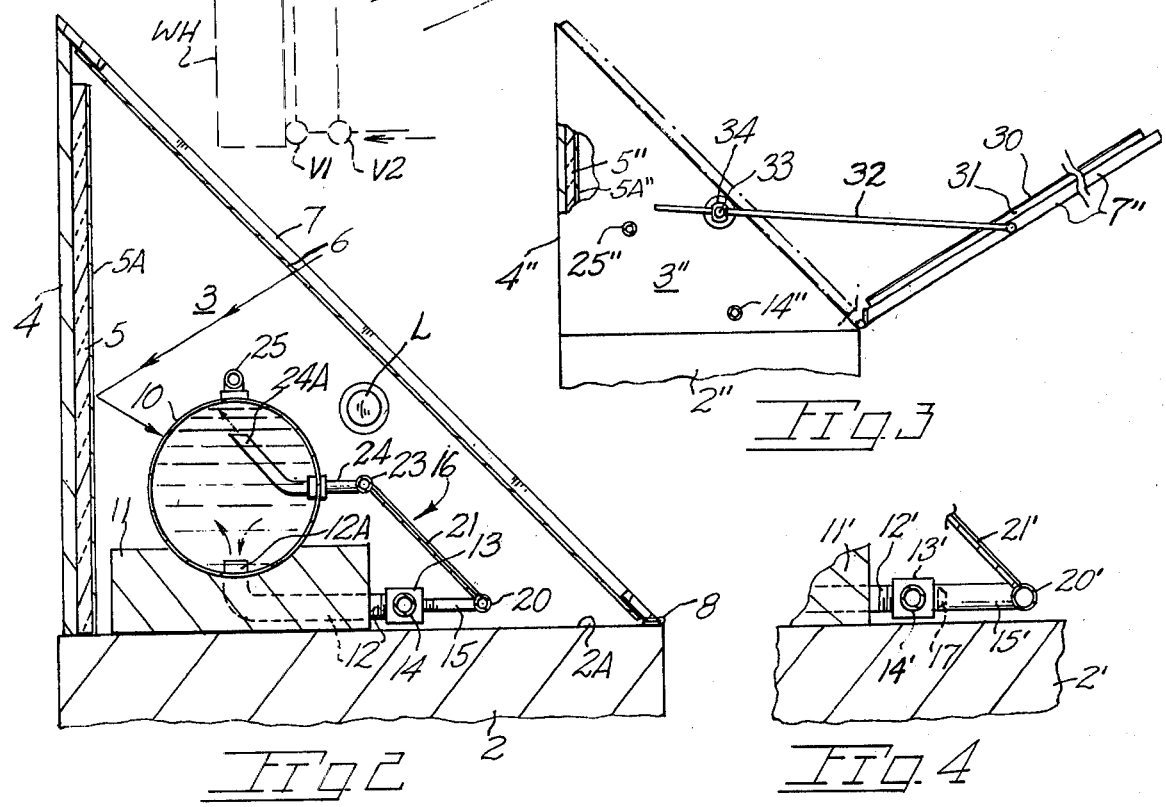

SOLAR WATER HEATER

BACKGROUND OF THE INVENTION

The present invention pertains generally to a water heater structure heated by solar energy.

The prior art discloses several arrangements wherein a solar panel is in fluid communication with a storage tank. The cost of manufacture of such known arrangements is contributed to by the complexity of communicating plumbing between the panel and tank. Such plumbing desirably permits water heated by the solar panel to pass to the tank by reason of heat siphoning. While heat siphoning is shown to be a recognized feature of several solar water heaters, the same is only accomplished in heaters of prohibitive cost.

The general combination of a water storage tank and solar panel is found in the following U.S. Pat. Nos. 2,311,579; 2,553,073; 4,083,490; 4,084,578; 4,146,087; 4,165,735 and 4,166,449. Solar radiant heated storage tanks are not found in the known art. A further drawback to known combinations of solar panels and storage tanks is that of excessive weight. Roof installation of solar water heaters typically requires reinforcement of the roof structure to support the added weight. Such reinforcement efforts are, of course, directly related to the weight of the installed water heater, hence it is a desirable objective to minimize water heater weight.

SUMMARY OF THE PRESENT INVENTION

The present invention is embodied within a solar powered water heater having provision for directing incoming cold water to a lowermost area of a water storage tank while permitting heat siphoning to occur by means of a reverse flow through the inlet conduit.

The present water heater structure includes a base for convenient placement such as on a home roof. Atop said base is a housing having an open side for the admission of radiant energy. Said housing mounts a solar panel having inlet and outlet manifolds with panel heated water being discharged toward an upper area of the water heater tank.

Conduit means serving said tank and the solar panel directs incoming cold water to the tank and thereafter permits a reverse flow during heat siphoning.

Important objects include the provision of a solar water heater through which water circulates without the aid of valves, pumps, thermostatic controls, etc., but rather by heat siphoning with a conduit serving to carry water flows in two directions; the provision of a water heater of the solar type of low cost, relatively lightweight construction enabling roof placement of same with little or no roof reinforcement or modification; the provision of a water heater of the passive type with both a solar panel and a tank heated by radiant energy and requiring no electric power for operation.

BRIEF DESCRIPTION OF THE DRAWINGS

In the accompanying drawings:

FIG. 1 is a perspective view of the present water heater in place on a roof structure;

FIG. 2 is a vertical sectional view taken along line 2—2 of FIG. 1 showing water heater details;

FIG. 3 is an end view of a modified solar water heater; and

FIG. 4 is a fragmentary view of a modified panel supply conduit.

DETAILED DESCRIPTION OF THE PREFERRED EMBODIMENTS

In the drawing, applied reference numerals indicate parts hereinafter similarly identified, the reference numeral 1 indicates a roof structure on which the present water heater may be located. Other locations may be equally suitable if proper solar exposure is provided for.

A base 2 may be of frame construction having an upper surface 2A for support of the following described structure. Securement to the roof of the base is by suitably anchoring means located interiorly of the base.

A housing includes sidewalls 3 of triangular shape and a backwall 4 which is insulated with a layer of foil backed insulation as at 5 with a reflective foil sheet at 5A. A window at 6 admits radiant energy with a window frame at 7 being hingedly mounted at 8 (FIG. 2). Use of a synthetic glazing such as one of fiber glass is preferable to glass for obvious reasons.

A water storage tank is at 10 in place on a support 11. Serving said tank is a tank supply conduit at 12 having a tank located end 12A. A conduit union at 13 delivers a cold water, pressurized flow to conduit 12. An inlet conduit at 14 may be in communication with a municipal water system. Conduit union 13 receives one end of a solar panel supply conduit 15 which terminates oppositely in communication with a solar panel indicated generally at 16. Solar panel supply conduit 15 is of lesser flow capacity than conduit means 12 which may be accomplished in a convenient, low cost manner by the use of a conduit of a lesser inside diameter. Other means could include the use of a flow impeding device as at 17 in a substitute solar panel supply conduit at 15' in FIG. 4. Other structure analogous to the foregoing is indicated by prime reference numerals.

Solar panel 16 may be of conventional construction having an inlet manifold 20, a heat collecting surface 21, water passageways 22 (FIG. 1) and an outlet manifold 23. A tank return conduit at 24 communicates the outlet manifold to the tank interior and terminates at 24A subjacent the tank upper limits. A tank outlet is at 25 which may communicate with a conventional water heater WH to supplement same and reduce the power usage of same.

In operation, a cold water flow to the solar water heater occurs during opening of a hot water valve in the home water system. Cold water under system pressure will flow into water tank 10 commensurate with hot water usage. A cold water flow to the solar panel is accordingly prevented. Under a static, no water use condition, water in tank 10 and solar panel will move in a heat siphoning manner, i.e., heated water in the solar panel will rise by convection to enter the tank via tank return 24 while pre-heated water within the tank's lower portion will pass via conduit means 12, union 13 and panel supply conduit 15 to the solar panel. Tank 10 is also heated by direct and reflected energy from the sun.

A modified solar water heater is shown in FIG. 3 wherein structure similar to that earlier described is indicated by double prime reference numerals. In place on a window at 7" is a reflective sheet 30 which may be the foil backing on an insulative sheet 31. Window retention means includes a rod at 32 pivotally attached to the window and is adjustably secured adjacent its remaining end by a thumbscrew 33 on an internally threaded rotatable guide 34. Accordingly, in dry climates, the window may remain in the open, full line position for added reflective heating of the tank. The window position may be adjusted in accordance with the sun's elevation above the horizon to provide maximum reflection of solar rays onto solar panel 16.

A heat lamp at L in FIG. 1 may be thermostatically controlled to prevent below freezing temperatures within the water housing. Drains, not shown, permit alternative solar water heater drainage in cold weather while water heater WH receives the source flow directly via valves V1–V2.

While I have shown but a few embodiments of the invention it will be apparent to those skilled in the art that the invention may be embodied still otherwise without departing from the spirit and scope of the invention.

Having thus described the invention, what is desired to be secured under a Letters Patent is:

I claim:

1. A solar water heater including, a housing including a window swingably positionable to expose the housing interior to solar radiant energy, a reflective sheet in said housing, a second reflective sheet on said window and positionable therewith to reflect radiant energy toward the housing interior, a solar panel within said housing having passageways through which water flows for exposure to solar heater panel surfaces, a water tank in fluid communication with the panel and receiving heated water therefrom said tank adapted to receive both direct and reflected solar radiant energy from said reflective sheets, a tank supply conduit in communication with a lower internal area of said tank and receiving water from a pressurized source for delivery to said tank area, a panel supply conduit in communication with said tank supply conduit and admitting a flow of water from the tank to the panel during heat siphoning of panel heated water to said tank, said tank supply conduit of greater flow capacity than said panel supply conduit to cause incoming water from said source to flow toward said tank to prevent incoming water from said source initially entering the solar panel passageways.

2. The water heater claimed in claim 1 wherein said tank supply conduit is of greater crossection than said panel supply conduit.

3. The water heater claimed in claim 1 wherein said panel supply conduit includes a flow impeding device.

4. The water heater claimed in claim 1 wherein said housing additionally includes window retention means including a rod coupled to said housing and limiting opening swinging movement of the window whereby the window may be positioned for maximum reflection of solar rays toward the solar panel.

* * * * *